(12) United States Patent
Prentice et al.

(10) Patent No.: US 7,453,498 B2
(45) Date of Patent: *Nov. 18, 2008

(54) ELECTRONIC IMAGE CAPTURE DEVICE AND IMAGE FILE FORMAT PROVIDING RAW AND PROCESSED IMAGE DATA

(75) Inventors: Wayne E. Prentice, Honeoye Falls, NY (US); Hiroshi Yamagata, Kanagawa (JP); Kenneth A. Parulski, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 272 days.

This patent is subject to a terminal disclaimer.

(21) Appl. No.: 11/296,915

(22) Filed: Dec. 8, 2005

(65) Prior Publication Data

US 2006/0152609 A1  Jul. 13, 2006

Related U.S. Application Data

(63) Continuation-in-part of application No. 10/394,598, filed on Mar. 21, 2003, now Pat. No. 7,170,552, which is a continuation of application No. 09/048,622, filed on Mar. 26, 1998, now Pat. No. 6,567,119.

(51) Int. Cl.
*H04N 5/228* (2006.01)

(52) U.S. Cl. ............................... 348/222.1; 348/231.99; 348/231.2; 348/231.6

(58) Field of Classification Search ............. 348/222.1, 348/223.1, 234, 231.6, 231.2, 231.99, 252, 348/273, 272

See application file for complete search history.

(56) References Cited

U.S. PATENT DOCUMENTS

| 3,971,065 | A | | 7/1976 | Bayer |
| 4,774,574 | A | | 9/1988 | Daly et al. |
| 4,962,419 | A | | 10/1990 | Hibbard et al. |
| 5,065,229 | A | * | 11/1991 | Tsai et al. ................ 348/391.1 |
| 5,164,831 | A | | 11/1992 | Kuchta et al. |
| 5,172,227 | A | | 12/1992 | Tsai et al. |
| 5,189,511 | A | | 2/1993 | Parulski et al. |
| 5,373,322 | A | | 12/1994 | Laroche et al. |

(Continued)

OTHER PUBLICATIONS

Tag Image File Format, Revision 6.0, Adobe Developers Association, Jun. 3, 1992, ftp://ftp.adobe.com/pub/adobe/devrelations/devtechnotes/pdffiles/tiff6.pdf The TIFF 6.0 specification dated Jun. 3, 1992 specification (c) 1986-1988, 1992 Adobe Systems Incorporated.*

(Continued)

*Primary Examiner*—Tuan Ho
*Assistant Examiner*—Gary C Vieaux
(74) *Attorney, Agent, or Firm*—Pamela R. Crocker

(57) ABSTRACT

An electronic image capture device for capturing a color image, comprising an image sensor comprised of discrete light sensitive picture elements overlaid with a color filter array (CFA) pattern to produce sensor color image data corresponding to the CFA pattern; an A/D converter for producing uninterpolated digital CFA image data from the sensor color image data; a processor for processing the uninterpolated digital CFA image data to produce interpolated image data and for forming a TIFF image file containing both the uninterpolated CFA image data and the interpolated image data; and a memory for storing the TIFF image file.

7 Claims, 10 Drawing Sheets

U.S. PATENT DOCUMENTS

| | | |
|---|---|---|
| 5,382,976 A | 1/1995 | Hibbard |
| 5,418,565 A | 5/1995 | Smith |
| 5,442,718 A * | 8/1995 | Kobayashi et al. .......... 382/166 |
| 5,506,619 A | 4/1996 | Adams, Jr. et al. |
| 5,528,293 A * | 6/1996 | Watanabe ................ 348/231.2 |
| 5,606,365 A | 2/1997 | Maurinus et al. |
| 5,610,723 A | 3/1997 | Yamagishi |
| 5,629,734 A | 5/1997 | Hamilton, Jr. et al. |
| 5,668,596 A | 9/1997 | Vogel |
| 5,696,850 A * | 12/1997 | Parulski et al. .............. 382/261 |
| 5,821,999 A | 10/1998 | Barnsley et al. |
| 5,892,847 A | 4/1999 | Johnson |
| 5,900,909 A | 5/1999 | Parulski et al. |
| 5,912,972 A | 6/1999 | Barton |
| 5,915,038 A | 6/1999 | Abdel-Mottaleb et al. |
| 5,973,734 A | 10/1999 | Anderson |
| 5,983,229 A * | 11/1999 | Houchin et al. ............. 707/100 |
| 6,037,950 A * | 3/2000 | Meir et al. .................. 345/427 |
| 6,065,015 A | 5/2000 | Kazami |
| 6,091,862 A | 7/2000 | Okisu |
| 6,137,914 A | 10/2000 | Ligtenberg et al. |
| 6,151,069 A | 11/2000 | Dunton et al. |
| 6,151,074 A | 11/2000 | Werner |
| 6,160,554 A | 12/2000 | Krause |
| 6,222,646 B1 | 4/2001 | Maurinus et al. |
| 6,269,357 B1 | 7/2001 | Nakayama et al. |
| 6,288,743 B1 * | 9/2001 | Lathrop .................... 348/231.9 |
| 6,567,119 B1 * | 5/2003 | Parulski et al. ........... 348/207.2 |
| 6,625,325 B2 | 9/2003 | Gindele et al. |
| 6,650,366 B2 | 11/2003 | Parulski et al. |
| 2004/0227824 A1 * | 11/2004 | Takahashi ................... 348/234 |

OTHER PUBLICATIONS

Adobe Systems Incorporated: "Digital Negative (DNG) Specification Version 1.1.0.0" [on line] Feb. 2005.

"Tiff Specification Revision 6.0" Tiff Revision 6.0 Jun. 3, 1992, pp. 1-121.

* cited by examiner

US 7,453,498 B2

ELECTRONIC IMAGE CAPTURE DEVICE AND IMAGE FILE FORMAT PROVIDING RAW AND PROCESSED IMAGE DATA

CROSS REFERENCE TO RELATED APPLICATIONS

This patent is a continuation-in-part of the U.S. Ser. No. 10/394,598, filed Mar. 21, 2003 now U.S. Pat. No. 7,170,552, published Sep. 25, 2003, No. 2003/0179297; which is a continuation of U.S. Ser. No. 09/048,622 filed on Mar. 26, 1998, now U.S. Pat. No. 6,567,119, issued May 20, 2003; which is a CPA of U.S. Ser. No. 09/048,622, filed Mar. 26, 1998, now abandoned.

FIELD OF THE INVENTION

The invention relates generally to the field of electronic photography, and in particular to an electronic imaging system of the type that generates a standard format file.

BACKGROUND OF THE INVENTION

A typical digital camera uses a single color image sensor to capture a representation of a scene, including a representation of the color in the scene. The colors are separated by a color filter array (CFA) that overlies the sensor and associates each image pixel with a particular color according to the particular color pattern of the CFA. For example, the Bayer CFA (described in U.S. Pat. No. 3,971,065) provides an RGB pattern with a checkerboard arrangement of green pixel sites. Therefore, the primary CFA image signal for each pixel relates to but one color, that is, to either red, green or blue (for a Bayer CFA). After the CFA image is captured, the remaining (missing) colors for each pixel site are interpolated for each pixel from, e.g., surrounding pixels, so that a full resolution interpolated record is generated for each image. Each pixel in the interpolated record therefore has a set of RGB values.

For many years, some types of digital cameras, such as the Kodak DC50 camera introduced in 1995, have stored the CFA image data as a "raw" TIFF image file on a removable memory card. Such a file is called a "raw" file because significant image processing, including CFA interpolation, is required before the image can be displayed or printed. The well-known TIFF (Tag Image File Format) allows different types of image data, including CFA image data, to be stored using a standard image file wrapper. ISO 12234-2:2001, Electronic still-picture imaging—Removable memory—Part 2: TIFF/EP image data format standardizes the way in which CFA image data, and metadata tags that specify the color arrangement of the CFA, can be stored within a TIFF file. However, before such a "raw" file can be displayed or printed, it must be interpolated and converted to standard color image data, such as sRGB color image data. This standard color image data can be displayed or printed, or can be compressed and stored using a standard file format, such as for example a JPEG file format, a JPEG 2000 file format, or a FlashPix file format.

The process used to convert the image to a standard file format, and to print and edit the standard format, is shown in FIG. 1. The CFA image is captured in a capture step 10 by the camera. When the camera or memory is connected to a host computer in a connect step 12, the images are downloaded from the camera or memory card in a downloading step 14, processed in a processing step 16 and stored in a standard file format in a file formatting step 18. In the processing step 16, the CFA images are CFA interpolated as they are imported, using known CFA interpolation, color correction, and sharpening techniques, in order to create a "finished" RGB image file having a standard size. The finished RGB image file thus contains the CFA interpolated image, which has the same number of total pixels as the original image. Unlike the original image, however, the CFA interpolated image has complete RGB data for each pixel.

The advantage of using a standard file format is that it allows the image to be used by many different image software programs, photo printers, retail photo kiosks, and Internet based printing services supplied by many different companies. For this reason, most current digital cameras include a mode that produces and stores standard image files, such as JPEG image files. These image files are produced in the digital camera as the images are captured.

Many different standard image file formats are known and useful with this invention. One example of such a standard image file is a FlashPix file. FIG. 2 is a simplified diagram showing the key information stored in a FlashPix file. The FlashPix image format (defined in FlashPix Format Specification, version 1.1, (Digital Imaging Group, Jul. 10, 1997)) has been developed to serve as both an "interchange" format between devices (e.g. cameras) and applications (e.g. computer picture editing packages), and as a "native" format for image editing that allows the images to be easily and rapidly edited. This is accomplished using a hierarchical, tiled image representation within a "structured storage" file. Referring to FIG. 2, a FlashPix file contains the complete image data 24 plus a hierarchy of several lower-resolution copies within the same file (one set of lower resolution image data 25 is shown in FIG. 2).

Images at each resolution also are divided into rectangular tiles (e.g., squares), which enable the application to minimize the amount of image data processed to access, display or print a portion of the scene content. FlashPix allows thumbnail image data 23 and optional "ancillary" property set data 21 and 22 to be stored in the same structured storage file, along with the image data. This ancillary data can include digital audio recordings and parameters such as the time and date the photo was taken, the camera zoom position and focus distance, the scene illumination level, camera calibration data, image copyright owner, etc. For further information about the FlashPix image format see the aforementioned FlashPix Format Specification, version 1.1, (Digital Imaging Group, Jul. 10, 1997), which is available on the Wide World Web at http://www.i3a.org, and is incorporated herein by reference.

The image processing used to "finish" the image prior to storing the finished data in the FlashPix file includes operations such as CFA interpolation, color correction, and image sharpening. The output images are normally stored in a standard color space, such as the sRGB space which is supported by the FlashPix image format. As a consequence of generating the image file, the original camera data is discarded (step 26). If an image is to be printed or transmitted in an application step 28, the standard file format is first edited in an editing step 27.

To create final printed images, the finished image file may be adjusted by the user via an image processing program to create a final output image of the desired size, which may include only a "cropped", color adjusted portion of the image captured by the camera, or may, e.g., include multiple images in a "montage". More specifically, to provide the appropriately sized output image, the image processing program first crops the 750×500 RGB CFA interpolated image data, and then uses another interpolation algorithm in the editing step 27 to convert from the cropped version of the "finished" RGB image file to the final desired output image.

Note that this prior art approach uses two interpolation steps, one (step 16) to interpolate "missing" RGB data from the image sensor while maintaining the 750×500 pixel data array, and a second (step 27) to interpolate from the selected crop to the pixel data array that provides the desired output size. The user therefore selects the final print size (for example 8"×10"), and the image is interpolated up to produce an image data record of appropriate size for the printer. For example, if the output device printed at 200 pixels per inch, the image data would be interpolated to 1600×2000 pixels by the computer or the printer, (and optionally sharpened) to produce the desired image size. In addition, this known approach often uses two separate sharpening operations, one on the 750×500 pixel CFA interpolated image data following the CFA interpolation step 16, and a second one on the interpolated 1 600×2000 pixel image data array just prior to printing.

The prior art approach has a number of problems. First, the process of converting the image from the CFA image data (which may for example produce 12 bit per color data) to the 8 bit per color (24 bit per pixel) sRGB color space may limit the quality of certain images, by reducing the color gamut and dynamic range of the captured image. Second, the two interpolation steps (the CFA interpolation that produces a standard size image and the interpolation in the computer or printer that produces the desired print size) provide more interpolation artifacts than would be produced using a single interpolation step that interpolates from the sensor CFA data directly to the output image data sent to the printer. Finally, using two separate sharpening steps can also produce artifacts.

What is needed is a digital camera and a digital imaging system that maintains the advantages of using a standard, "finished" image file format so that the images can be used by many applications, yet also enables certain types of devices, including image editing software, to access the raw camera data in order to provide improved image quality when editing and printing the images.

SUMMARY OF THE INVENTION

The present invention is directed to overcoming one or more of the problems set forth above. Briefly summarized, according to one aspect of the present invention, an electronic camera for capturing a color image, comprises an image sensor comprised of discrete light sensitive picture elements overlaid with a color filter array (CFA) pattern to produce sensor color image data corresponding to the CFA pattern; an A/D converter for producing uninterpolated digital CFA image data from the sensor color image data; a processor for processing the uninterpolated digital CFA image data to produce interpolated image data and for forming a TIFF image file containing both the uninterpolated CFA image data and the interpolated image data; and a memory for storing the TIFF image file.

In accordance with another aspect of the present invention there is provided a single image file for storing images obtained from a color image capture device having an image sensor overlaid with a color filter array (CFA) pattern to produce uninterpolated CFA image data corresponding to the CFA pattern, the CFA image data subject to further processing to form interpolated and compressed image data, said single image file comprising: a first file area for storing the uninterpolated CFA image data; a second file area for storing the interpolated and compressed image data as JPEG image data within the single image file; and a third file area for storing a first image processing parameter used to produce the interpolated and compressed image data.

In accordance with yet another aspect of the invention there is provided a method for capturing and processing color images, said method comprising:

(a) in a digital image capture device, capturing an array of picture elements through a color filter array (CFA) and producing CFA image data; color image data corresponding to the CFA pattern;

(b) processing the CFA image data using image processing parameter(s) stored in the digital image capture device to produce interpolated image data;

(c) storing a single image file in a memory of the digital image capture device, the single image file including the CFA image data, the interpolated image data, and the image processing parameter(s);

(d) transferring the single image file to a second device;

(e) determining whether the second device is capable of processing the CFA image data; and (f) if the second device is capable of processing the CFA image data, accessing the CFA image data and the image processing parameter(s) in the single image file.

An advantage of the present invention is that the raw TIFF image file, which can be used/edited by raw image editing enabled application software like other raw files, also contains a standard finished file image, which can be extracted from the TIFF file and used for immediate display just like any standard image file.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because digital cameras employing electronic sensors, and electronic processing and storage of the resultant image data are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system as described in the following materials, all such software implementation needed to practice the invention is conventional and within the ordinary skill in such arts.

Figure 3:
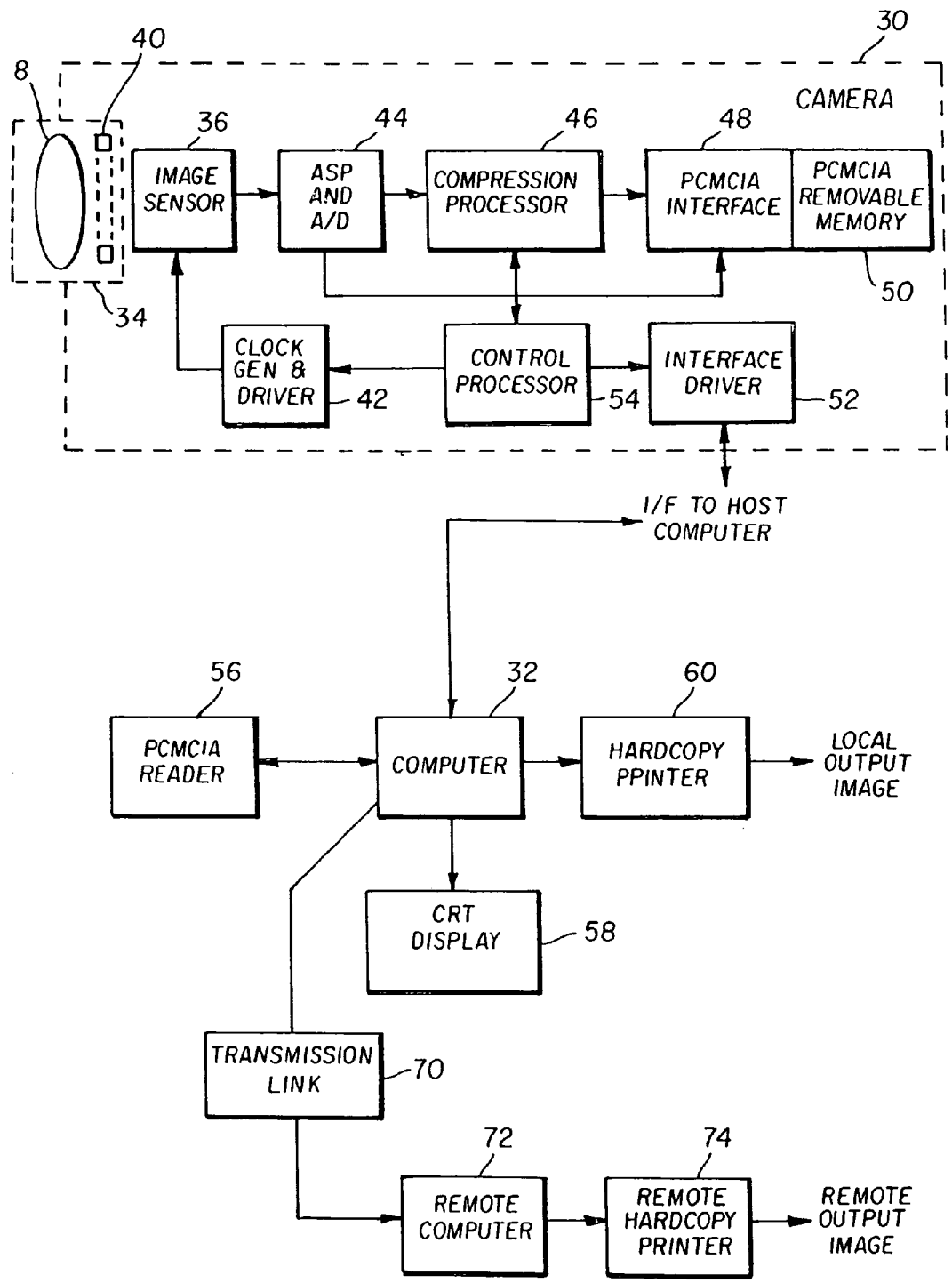
FIG. 3 is a block diagram of an electronic imaging system capable of storage and selective transmission of processed and unprocessed image data according to the invention.

Beginning with FIG. 3, a system block diagram shows a camera 30 and a host computer 32. The camera 30 includes an optical section 34 for directing image light upon an image sensor 36, typically a single image sensor such as a charge-coupled device (CCD). The image sensor 36 includes an array of discrete light sensitive picture elements; e.g., having 750× 500 pixels, overlaid with a color filter array (CFA) pattern to produce color image data corresponding to the CFA pattern. The optical section includes a lens 38 and a shutter-aperture device 40 for regulating the exposure of the image light upon the image sensor 36. A clock generator and driver circuit 42 provides the waveforms necessary for generating the color image data from the image sensor 36, and the output data is applied to an analog signal processing (ASP) and a 12-bit analog/digital (A/D) conversion section 44, which produces digital CFA data from the color image data.

The resultant digital data is applied to a digital signal processor 46, which may compress the image data using, e.g., a numerically lossless or visually lossless compression technique employing, e.g., DPCM coding, and otherwise process the image data for storage. The processed digital CFA data is applied to a removable memory 50 via an output interface 48. In operation, the CFA image data represents an image of a fixed size, usually an image substantially corresponding to the actual size of the image sensor 36. Consequently, the memory 50 stores the digital CFA image data from a fixed number of picture elements corresponding to this fixed image size. Moreover, the digital CFA image data stored in the memory 50 may be contained within an image file that also describes the type of color filter array pattern used on the image sensor, as well as a low resolution thumbnail version of the captured image.

The output interface 48 is a memory card interface 48a adapted to a conventional card interface standard, such as the PCMCIA card interface standard, such as described in the PC Card Standard, published by The Personal Computer Memory Card International Association, Sunnyvale, Calif., March 1997. The removable memory 50 accordingly is a non-volatile PCMCIA memory card containing either solid state memory, such as Flash EPROM memory, or a small hard drive (categorized as a PCMCIA-ATA Type III Hard Drive under the PCMCIA card interface standard). Another card interface standard is the CompactFlash ATA with DOS file format. Alternatively, other non-volatile storage devices may be used, such as a floppy disk magnetic medium or optical storage (in such cases, a suitable interface and a conventional read/write apparatus would be provided in the camera 30, e.g., a magnetic or optical read/write head).

In addition, the camera includes a host computer interface driver 52 for directly connecting the camera 30 to the host computer 32, for example, to download the digital CFA data corresponding to the captured images. (In this process, the removable memory 50 may serve as a buffer memory or a separate buffer memory (not shown) may be provided.) The camera 30 further includes a control processor 54 for controlling (a) the clock generator and driver circuit 42, (b) the digital signal processing chain comprising the ASP and A/D section 44, the digital signal processor 46 and the output interface 48, and (c) the interface driver 52. The interface driver 52 provides a conventional computer interface, such as a SCSI, IEEE-1394, USB, Firewire or RS-232 interface. Consequently, the digital CFA data from the camera 30 interfaces with the host computer 32 either through the interface driver 52, or through a card reader 56 that receives the removable memory 50.

In order to produce an output image, the host computer 32 includes application programs for processing the captured images and producing a soft copy on a display 58 or a hard copy on a printer 60 (or, e.g., a film writer or the like). For example, the application program (not shown) includes an algorithm section, which applies direct pixel mapping/cropping concurrent with CFA interpolation. The computer additionally includes a user interface (not shown) that provides user operated means for cropping to an output image size that uses a subset of pixels from the fixed image size provided by the camera. The application program then interpolates full color data for each picture element of the output image from the cropped picture elements and produces an interpolated output image having the selected output image size. The host computer 32 may be further connected through a transmission link 70 (e.g., internet) to a remote computer 72 and a remote output device 74, such as a hard copy printer.

Figure 1:
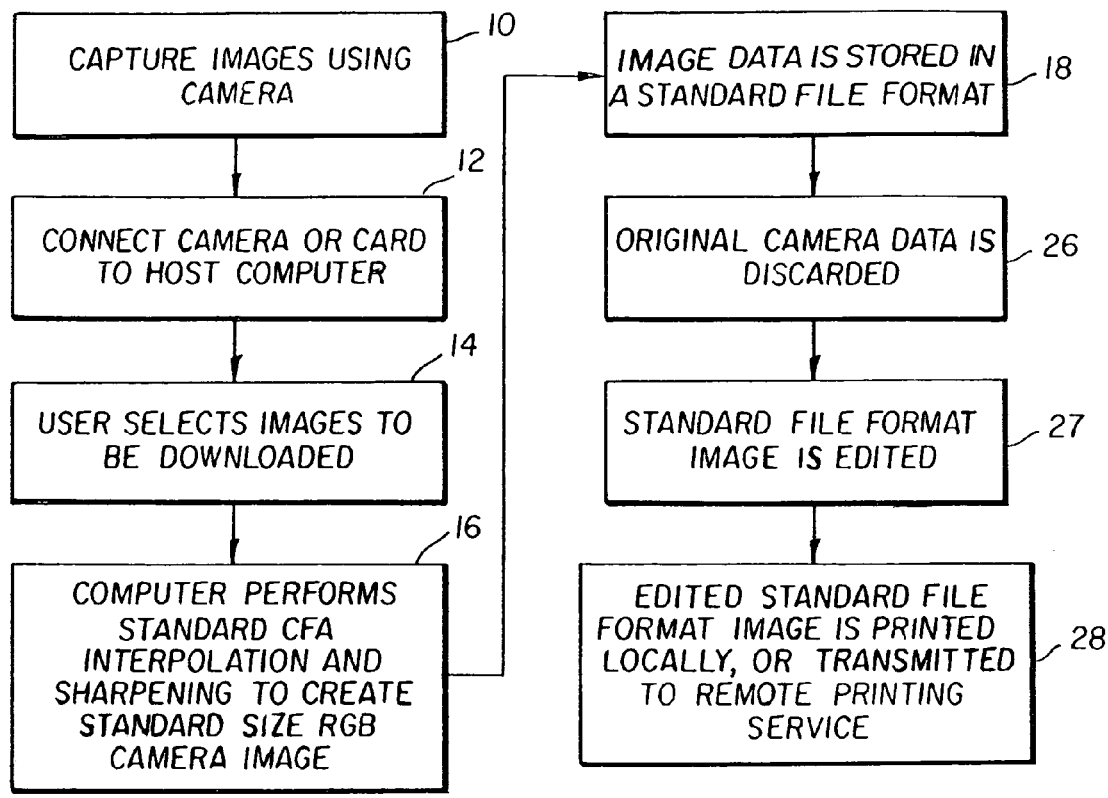
FIG. 1 is a flow diagram of a known technique for capturing and processing image data.
Figure 2:
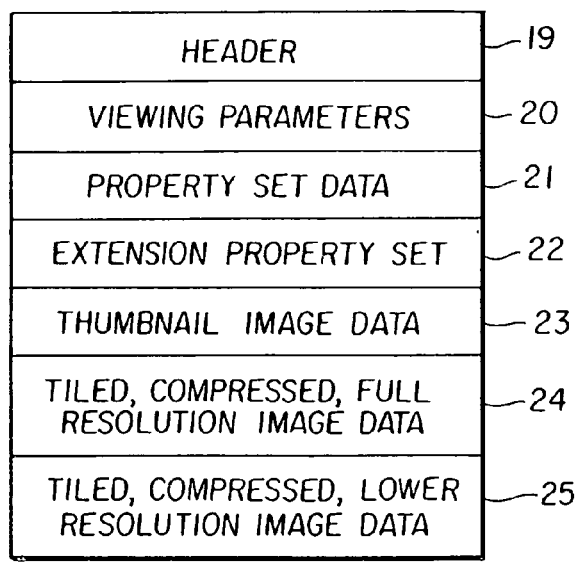
FIG. 2 is an illustration of the well known FlashPix file format.
Figure 4:
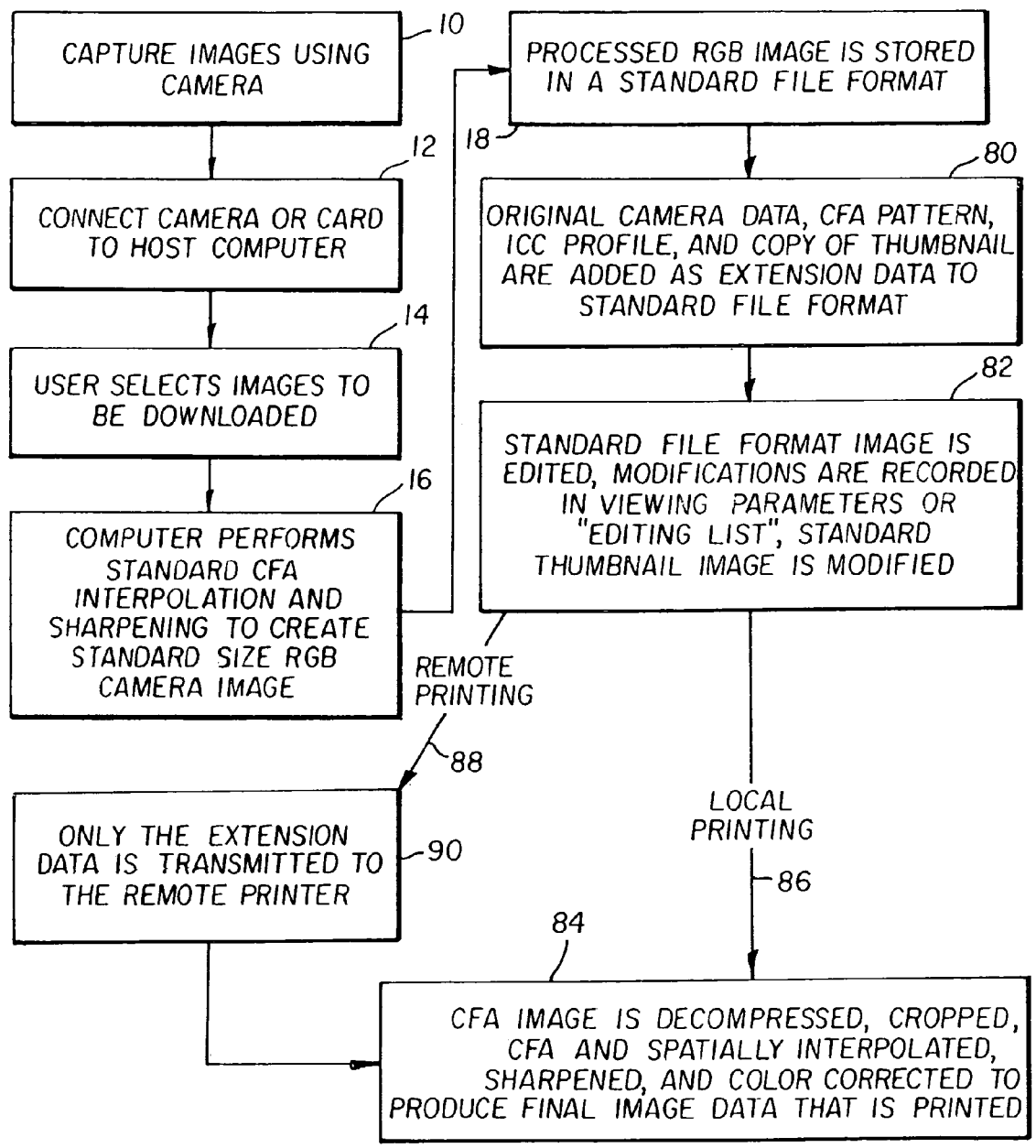
FIG. 4 is a flow diagram showing storage and selective transmission and processing of processed and unprocessed image data according to the invention.
Figure 5:
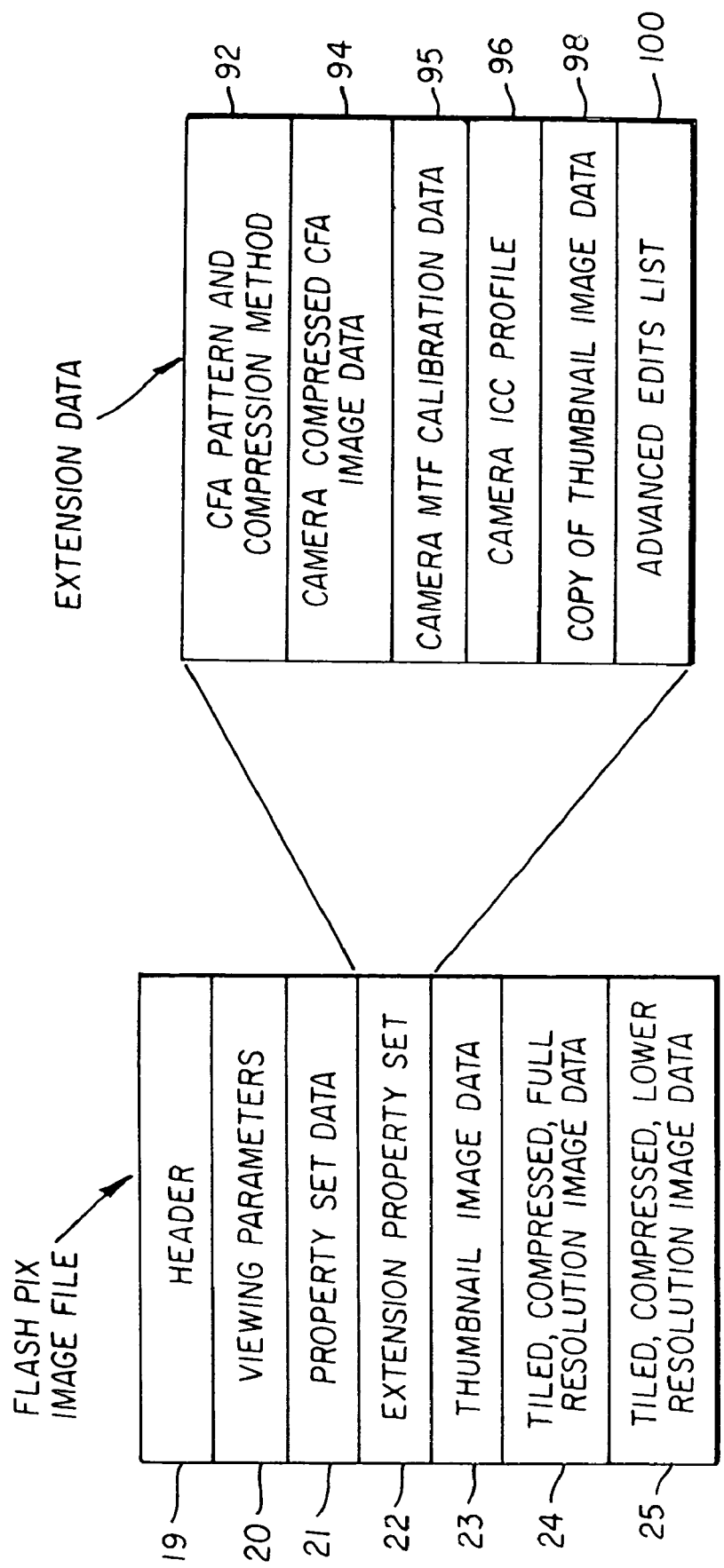
FIG. 5 is an illustration of a FlashPix file format incorporating extension data according to the invention.

Operation of the imaging system according to the invention is shown in the flow diagram of FIG. 4, and a representation of the image format used with this invention is shown in FIG. 5. As described in connection with FIG. 1, the user operates the camera to take pictures in the capture step 10, and then connects the camera or the card to the host computer in the connect step 12. The user selects the images(s) to be processed and converted to the finished file format, such as the FlashPix format, in the downloading step 14. To create the finished image data, the 750×500 Bayer pattern CFA image data from the camera is decompressed and interpolated as described in connection with the processing step 16 shown in FIG. 1, to produce CFA interpolated, color corrected, sRGB image data, which then can be stored during the file formatting step 18 in the tiled, hierarchical FlashPix file in the complete image field 24 and also in the lower resolution image field 25.

In accordance with the invention, a file format extension step 80 is provided in which the original 12-bit compressed CFA data is also stored within the same FlashPix file as the tiled image data, but in a CFA image data field 94 in the extension property set 22. More specifically (in reference to FIG. 5), the extension property set includes CFA pattern and compression method data 92, CFA image data 94, a camera ICC profile 96, thumbnail image data 98, and an advanced edits list 100. Accordingly, the extension data may include metadata that provides the CFA pattern used on the image sensor 36 and the compression method used by the digital signal processor 46, which is stored in the CFA pattern and compression method data 92. The camera MTF (modulation transfer function) values may be stored as a table in the MTF data 95. An ICC (International Color Consortium) profile, which characterizes the color of the CFA data stored in the extension property set 22, may be stored in the ICC profile 96. Note that this is a different ICC profile than the optional profile used within the FlashPix image file to describe the sRGB color data. In the standard usage of the FlashPix format, if the standard file format should be edited in an editing step 82, simple modifications (such as rotate, crop, and sharpen) do not modify the image data 24, 25. Rather, the list of modifications is recorded in the viewing parameters set 20, and the standard thumbnail data 23 is modified as well. More complex modifications, such as red-eye removal, require that portions of the image data be modified. To record these modifications so that they can later be applied to the CFA image data 94, the metadata lists this editing data in the advanced edits list 100 to describe edits performed by an applications program other than modifying the standard FlashPix viewing parameters. In addition, the metadata may also include a copy of the unmodified thumbnail image in the thumbnail image data 98, which can be compared to the modified thumbnail image data 23 to determine if any changes have been made to the original image data by subsequent image editing applications.

As explained above, if an image file is modified by the application, for example, by cropping, or adjusting the color or brightness of the image, the CFA image data 94 may no longer properly represent the edited image. In the FlashPix image format, a mechanism is specified that enables an application to determine the validity of ancillary data (such as the CFA image data 94) stored in an extension property set within a FlashPix file. Such an extension set is further described in U.S. Pat. No. 5,983,229, issued Nov. 9, 1999, assigned to the assignee of the present application. According to this patent, the extensions contain a field for indicating an extension persistence property. The extension persistence property indicates the validity of the extension data as a function of whether or not the core elements of the file are modified. The values for the extension persistence property, and their corresponding meanings, are as follows:

Value Meaning

0×0 Extension is valid and remains in the file independent of modifications to the core elements of the file.

0×1 Extension is invalid upon any modification to the core elements of the file, and must be removed from the file when core elements are edited.

0×2 Extension is potentially invalid upon modification to the core elements of the file, and must remain in the file until an application that understands the extension can determine if the extension is valid (remains in the file) or invalid (removed from the file).

The extension persistence value for the extension property set 22, according to the present invention, is set as 0×2 to indicate that the extension data (such as the CFA image data 94) is potentially invalid upon modification to the core elements of the file. The extension property set 22 therefore remains in the FlashPix file until an application that understands the extension can determine if the extension is valid or invalid.

The FlashPix file containing this extension data can now be used by any FlashPix enabled application, including applications that do not understand the meaning of the data within extension property set 22. More specifically, referring to FIG. 4, the file containing the extension data may be transmitted to a printing stage (step 84) via a local linkage 86 or via a remote linkage 88, in which case the extension data may be separated from the file (step 90) and sent to the printing stage (step 84). The image may be changed in a number of ways, e.g., cropped, lightened, and processed for red-eye removal. In some cases, (e.g., cropping, lightening) these changes can be done by adjusting the viewing parameters 20 in the FlashPix file, rather than by modifying the image data 24, 25. In all cases, however, the applications program modifies the standard FlashPix thumbnail image data 23 to accurately reflect the image modifications.

When the image data is printed by an "old" printer that does not understand the meaning of the extension property set 22, the standard FlashPix image data is printed the same way as in the prior art. If the printing application understands the extension property set 22, however, it normally processes the CFA image data stored in the extension to provide the data to be printed. This is done as described in U.S. Pat. No. 6,650,366, issued Nov. 18, 2003. In this application, the "original" image data (which is optionally compressed using a numerically lossless or visually lossless technique) is stored in a digital image file on a digital memory and transferred to the host computer. This image file is retained until a final rendered image is created. A "soft copy" quality version of the image can be displayed to the user, who can decide to crop the image and to create an output image of any size to be printed, incorporated into other documents, etc. The advantage is this: To create the final high quality image, the cropped portion of the original pixel data is directly interpolated (and optionally sharpened) in a single stage to create the proper output image size. By directly mapping the input pixels to the desired output pixels in a single stage that includes CFA interpolation, interpolation artifacts are minimized. In addition, if the image is sharpened in this stage, the sharpness of the output image is improved without degradation from artifacts due to multiple sharpening stages.

Accordingly, the 750×500 Bayer pattern digital CFA image data from the camera is decompressed and cropped as specified by the user, for example a 256×256 square portion of the image may be used. The CFA interpolation and spatial processing are then combined in a single processing step, as shown in more detail in U.S. Pat. No. 6,650,366, to produce the final output image data, which could be a larger square image, e.g., 1024×1024 pixel image. The CFA interpolation step may practice any of a number of known interpolation techniques. For instance the interpolation techniques in the following patents may be used: U.S. Pat. Nos. 5,373,322; 5,382,976; 5,506,619; and 5,629,734. Each of these patents is incorporated herein by reference.

After the final size image record is interpolated, the image is sharpened in a single sharpening step. This sharpening may use the technique described in U.S. Pat. No. 5,696,850, incorporated herein by reference. This patent uses a modulation transfer function (MTF) calibration data 95 from the camera and the printer MTF data (not shown) to determine the appropriate sharpening filter for optimally sharpening digital reproductions of any size taken by an electronic camera. The image data is finally printed out in hardcopy form in the hardcopy printer 60 or in the remote printer 74 (FIG. 3).

To ensure that the image data in the file has not been altered by an image processing application (which, for example, might have implemented "red eye" reduction or the like), the original thumbnail image data 98 in the extension property set 22 is processed by applying any viewing parameters 20 contained in the FlashPix file (or any advanced edits 100 contained in the extension property set 22) and comparing the result with the standard thumbnail image 23 in the same file. If the two images are different, this indicates that the original image data has been modified in an unknown way and that the CFA image data 94 should not be used to make the output print image. In this case, the output print is made using the standard FlashPix image data 24, as in the case where an "older" printer is not aware of the extension data.

Many applications are able to open images stored in "JPEG interchange format" (JEF) files defined by the Baseline DCT (JPEG) version of ISO/IEC 10918-1, which is incorporated herein by reference. This standard allows "application segments" to be included in the JIF bitstream. The data inside an application segment is ignored by applications that are not familiar with the meaning of the data in the application segment. A number of image file formats have been developed which use a single application segment to store ancillary data and a reduced-resolution "thumbnail" image. These image formats include JFIF, defined in "JPEG File Interchange Format Version 1.02 Sep. 1, 1992 C-Cube Microsystems", the JPEG compressed version of Exif (Exchangeable image format) described in "Digital Still Camera Image File Format Proposal (Exif) Version 1.0 Mar. 24, 1995 JEIDA/Electronic Still Camera Working Group" and SPIFF, defined in "ITU-T Rec. T.84, Annex F—Still Picture Interchange File Format, 1995", which are each incorporated herein by reference.

Figure 6:
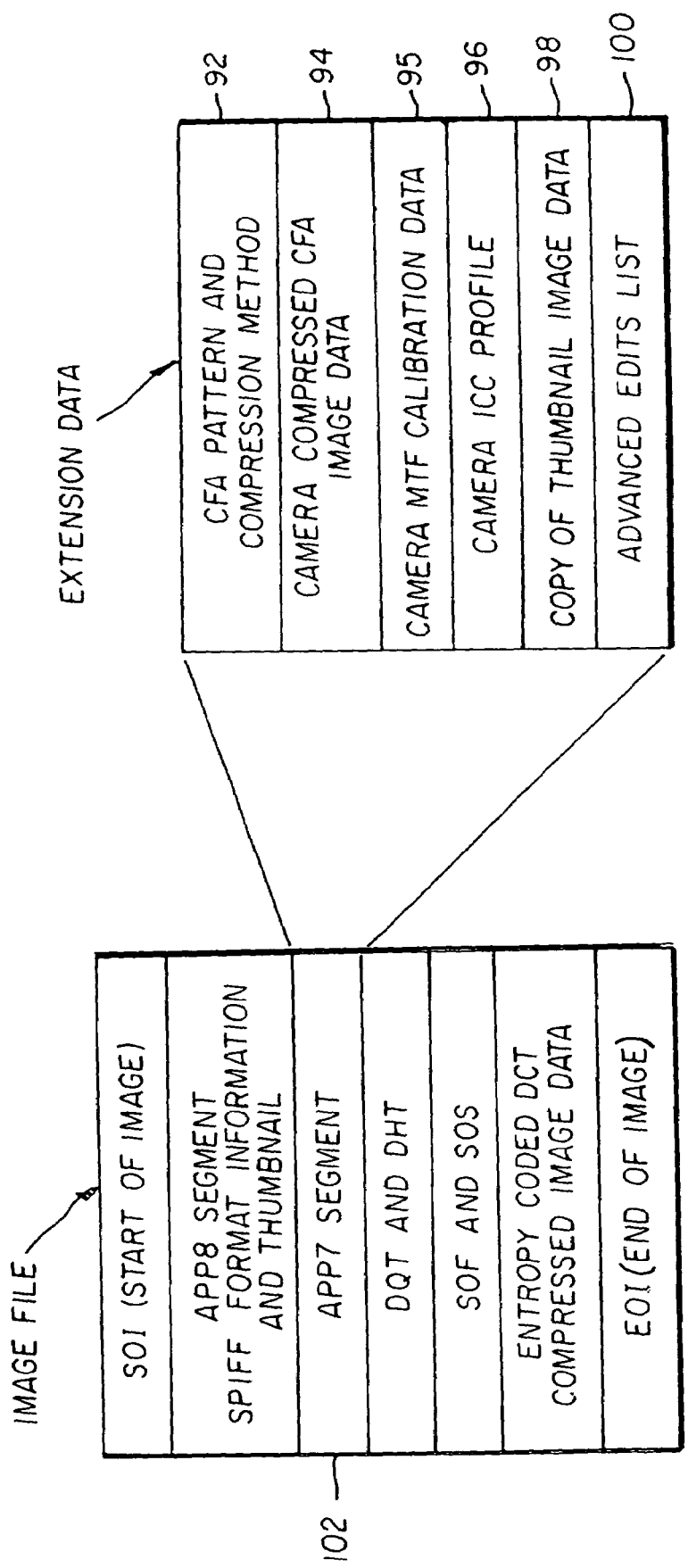
FIG. 6 is an illustration of a JPEG interchange file format incorporating extension data according to the invention.

In a second embodiment shown in FIG. 6, a JPEG interchange format file is used. The file contains a complete JPEG data stream which is valid according to the ISO JPEG standard (ISO/IEC 10918-1). The fields cited in FIG. 6 are identified as follows:

SOI=start of image
APP=application segment
DQT=define quantization tables
DHT=define huffman tables
SOF=start of frame
SOS=start of scan
EOI=end of image More specifically, the JPEG data stream also includes an application segment 102 (application segment 7 (APP7), in this example) that includes the same type of information as stored in the FlashPix extension property set 22, as described in connection with FIG. 5.

FIG. 7 through FIG. 10 relate to a further embodiment of the present invention. In this embodiment, the uninterpolated image data from the image sensor 36 is stored as so-called "raw" camera data using the TIFF image format. This TIFF image file is fully compatible with the TIFF-EP standard, defined in ISO 12234-2:2001, which is available from the International Standards Organization in Geneva, Switzerland.

One problem with using normal TIFF-EP raw files is that all applications must perform the processing needed to convert the raw data into interpolated data, prior to display or printing. Different digital cameras use different types of interpolation processing, it is difficult to provide processing for all such cameras within an image display application, image editing application or digital printer.

Figure 7:
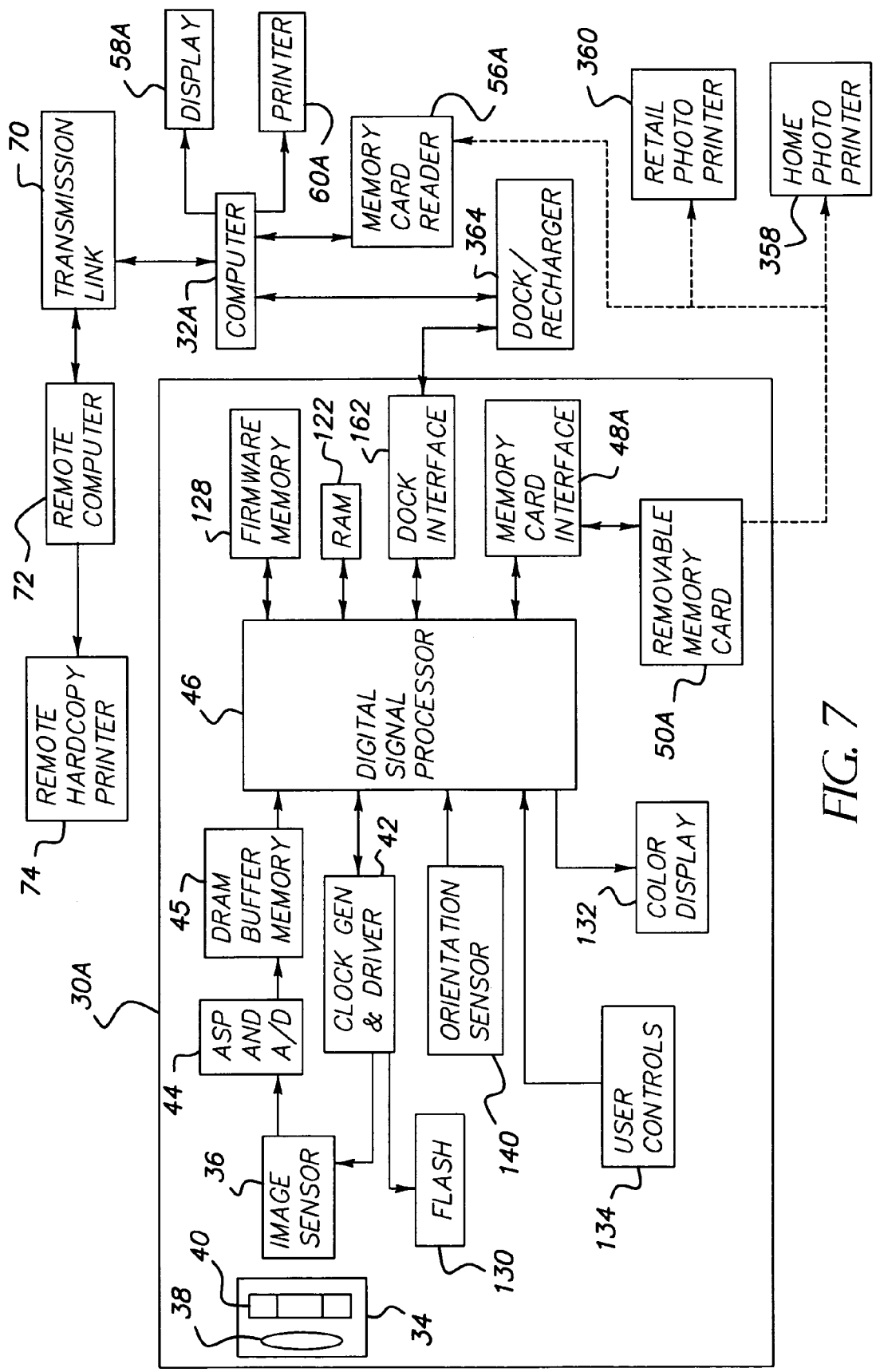
FIG. 7 is a block diagram of an electronic imaging system showing a further embodiment of the invention.

Because TIFF files can support multiple images within a single file, the inventors of the present invention have recognized that a "finished" processed and compressed JPEG image can be provided within a TIFF-EP file, while still maintaining compatibility with the TIFF-EP standard. The JPEG image data within the TIFF file can be used to enable compatibility with devices (such as computer software applications or home photo printers) that are not able to process a "raw" camera file. The raw image data only needs to be accessed by the image is to be modified by an image editor FIG. 7 is a block diagram of an additional embodiment of an electronic imaging system according to the present invention. The electronic imaging system includes a camera 30A, which captures and stores images on a removable memory card 50A. As described earlier in reference to FIG. 3, the digital camera 30A includes an optical section 34 for directing image light upon an image sensor 36, preferably a single color image sensor such as a charge-coupled device (CCD) or CMOS image sensor. The image sensor 36 includes an array of discrete light sensitive picture elements overlaid with a color filter array (CFA) pattern to produce color image data corresponding to the CFA pattern. The image sensor 36 can have, for example, a 4:3 image aspect ratio and a total of 3.1 effective megapixels (million pixels), with 2048 active columns of pixels×1536 active rows of pixels. The image sensor 36 can use a ½" type optical format, so that each pixel is approximately 3.1 microns tall by 3.1 microns wide.

The optical section 34 includes a zoom lens 38A and a shutter-aperture device 40 for regulating the exposure of the image light upon the image sensor 36. A clock generator and driver circuit 42 provides the waveforms necessary for generating and transferring the color image data from the image sensor 36 to provide sensor output data, and this sensor output data is applied to an analog signal processing (ASP) and a 12-bit analog/digital (A/D) conversion section 44, which produces digital CFA data from the color image data. The clock generator and driver circuit 42 also controls a flash unit for illuminating the scene (not shown) when the ambient illumination is low. If the image sensor 36 is a CMOS image sensor, the ASP and A/D 44 and the clock generator and driver 42 can be included with the image sensor 36 in the same integrated circuit.

The resultant digital data from the ASP and A/D 44 is temporarily stored in a DRAM buffer memory 45, and then applied to the digital signal processor 46. The processing performed by the digital signal processor 46 is controlled by firmware stored in a firmware memory 128, which can be flash EPROM memory. It should be noted that the digital signal processor 46, while typically a programmable image processor, can alternatively be a hard-wired custom integrated circuit (IC) processor, a general purpose microprocessor, or a combination of hard-wired custom IC and programmable processors.

The digital signal processor 46 also interfaces to user controls 134 and provides color signals to the color display 132. The graphical user interface displayed on the color display 132 is controlled by the user controls 134. After images are captured, they can be reviewed on a color display 132 by using the thumbnail or screennail image data stored in a DRAM 122. The user controls 134 also allow the user to set various camera parameters, such as the white balance setting, color setting, sharpness level setting, and compression quality setting.

The user controls 134 can include a zoom control (not shown) that controls the focal length setting of the zoom lens 38A. Once the maximum telephoto zoom setting has been reached, the digital signal processor 46 can crop and resample the image data provided by the image sensor 36 to provide "digital zoom", as will be described later in reference to FIG. 8.

The camera 30A also includes a gravitational orientation sensor 140. The gravitational orientation sensor 140 is used to determine whether the camera is in the normal horizontal "landscape orientation", a first (clockwise 90 degree rotated) vertical "portrait" orientation, or a second (counter-clockwise 90 degree rotated) vertical "portrait" orientation at the time the digital image is captured. The signal from the gravitational orientation sensor 140 can be used to decide whether or not the digital signal processor 46 should automatically rotate the captured image to the proper "upright" orientation, as described in commonly-assigned U.S. Pat. No. 5,900,909, disclosure of which is incorporated herein by reference.

In some embodiments, the camera 30A can also include a "panoramic" mode, which provides a wide aspect ratio image by using only the central rows of pixels from the image sensor 36, while discarding the top and bottom rows. This can be done as described in commonly-assigned U.S. Ser. No. 11/062,174, filed Feb. 18, 2005, by Labaziewicz, et al., the disclosure of which is incorporated herein by reference.

The digital signal processor processes the captured CFA image data and produces a digital image file 450 (shown in FIG. 8), as will be described later in reference to FIG. 8. The digital image file 450 is provided to a memory card interface 48A, which stores the digital image file 450 on the removable memory card 50A. Removable memory cards 50A are one type of removable digital image storage medium, and are available in several different physical formats. For example, the removable memory card 50A can include (without limitation) memory cards adapted to well-known formats, such as the Compact Flash, SmartMedia, MemoryStick, MMC, SD, or XD memory card formats. Other types of removable digital image storage media, such as magnetic hard drives, magnetic tape, or optical disks, can alternatively be used to store the still and motion digital images. Alternatively, the digital camera 30A can use internal non-volatile memory (not shown), such as internal Flash EPROM memory to store the processed digital image files. In such an embodiment, the memory card interface 48A and the removable memory card 50A are not needed.

The camera 30A includes a dock interface 162 for connecting the camera 30A to a dock/recharger 364, which is in turn connected to computer 32A. The dock/recharger 364 can recharge the batteries (not shown) used to power the camera 30A. The dock interface 162 and dock/recharger 364 communicate using a conventional computer interface, such as a USB or IEEE-1394 interface. Consequently, the digital image files 450 provided by the digital camera 30A can be transferred to the computer 32A either through the dock/recharger 364 or through a memory card reader 56A, using the removable memory card 50A.

In order to produce an output image, the host computer 32A includes application programs for processing the transferred image files and producing a soft copy that is displayed on a display 58A, or a hard copy that is printed on a printer 60A. The application program (not shown) processes the raw image data from the image file, to enable the user to adjust various image processing parameters, as will be described later in reference to FIG. 8. For example, the graphic user interface displayed on the display 58A can include a user control that provides user operated means for cropping to an output image size that uses a subset of pixels from the fixed image size provided by the camera. The application program then interpolates full color data for each picture element of the output image from the cropped picture elements and produces an interpolated output image having the selected output image size. The graphic user interface can also enable the user to adjust the tone reproduction, color reproduction, white balance, noise cleaning settings, and sharpness of the image.

The computer 32A may be further connected through a transmission link 70 (e.g., internet) to a remote computer 72 and a remote output device 74, such as a hard copy printer, as was described earlier in relation to FIG. 3. The removable memory card 50A can also be inserted into a memory card slot (not shown) in a home photo printer 358 and a retail photo printer 360.

Figure 8:
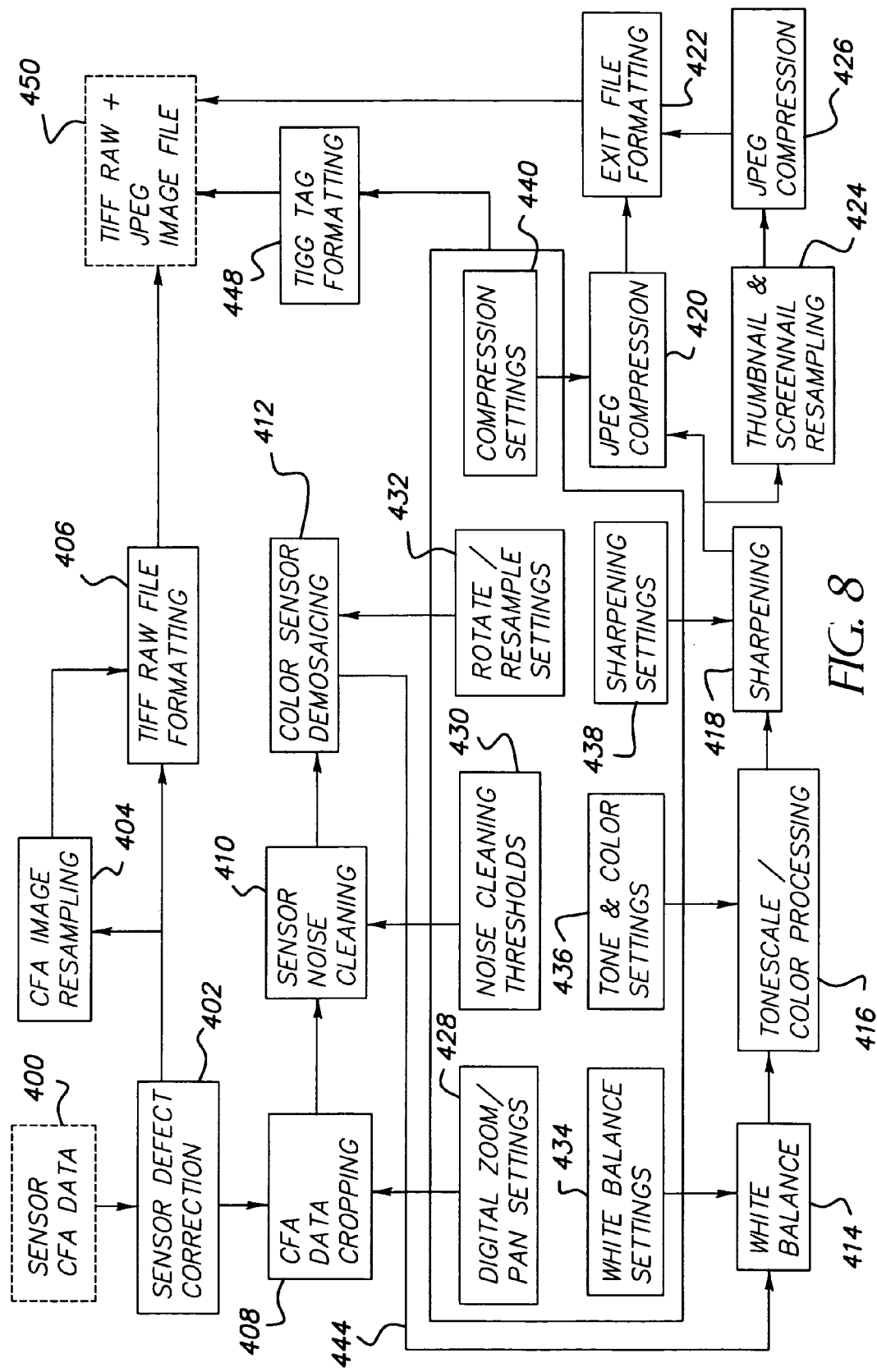
FIG. 8 is a block diagram depicting an example of the image processing operations that can be performed to produce an image file providing raw and compressed image data.
Figure 9A:
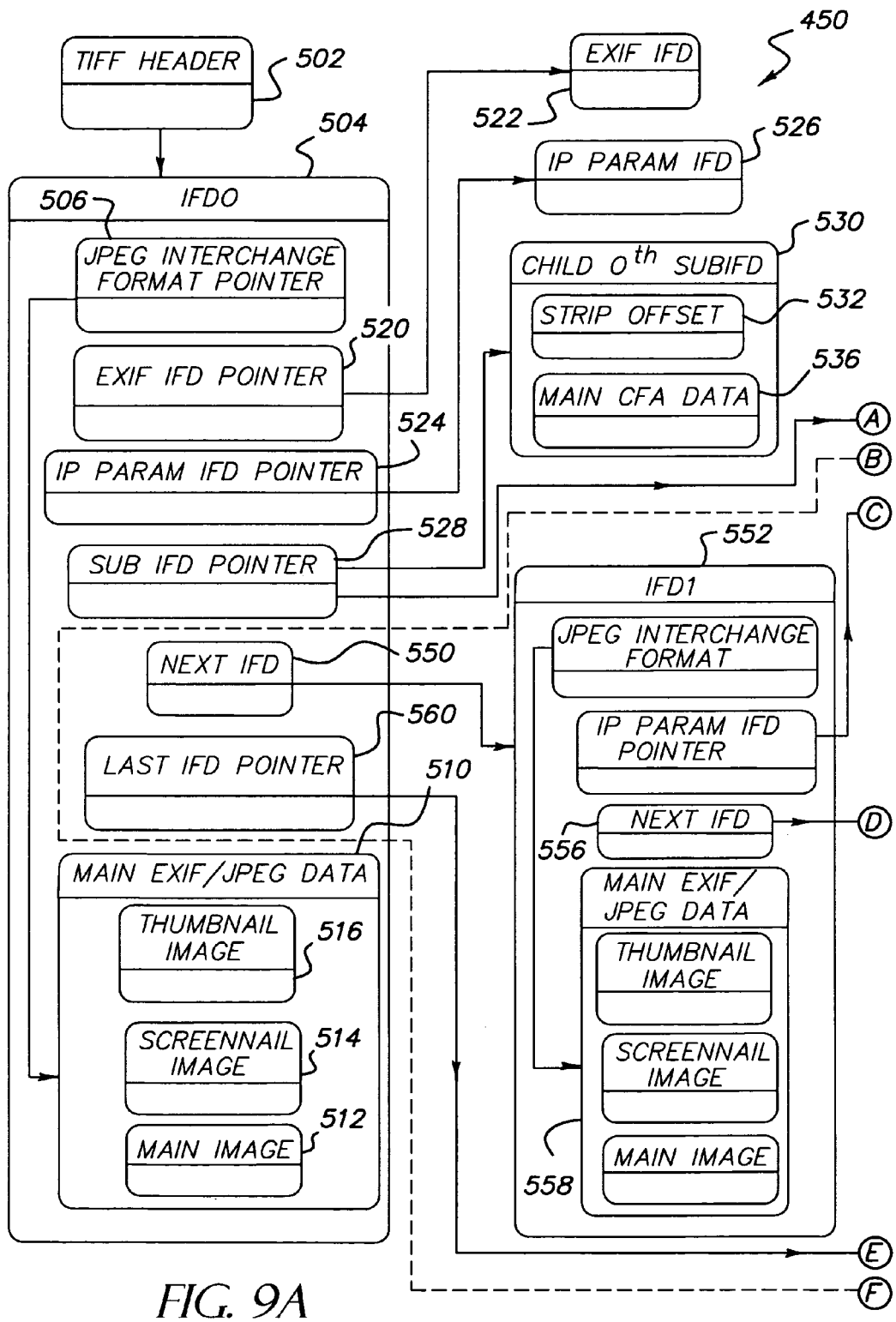
FIGS. 9A and 9B, in combination, are an illustration of a TIFF image file containing RAW image data, JPEG compressed image data, and image processing parameter metadata.
Figure 9B:
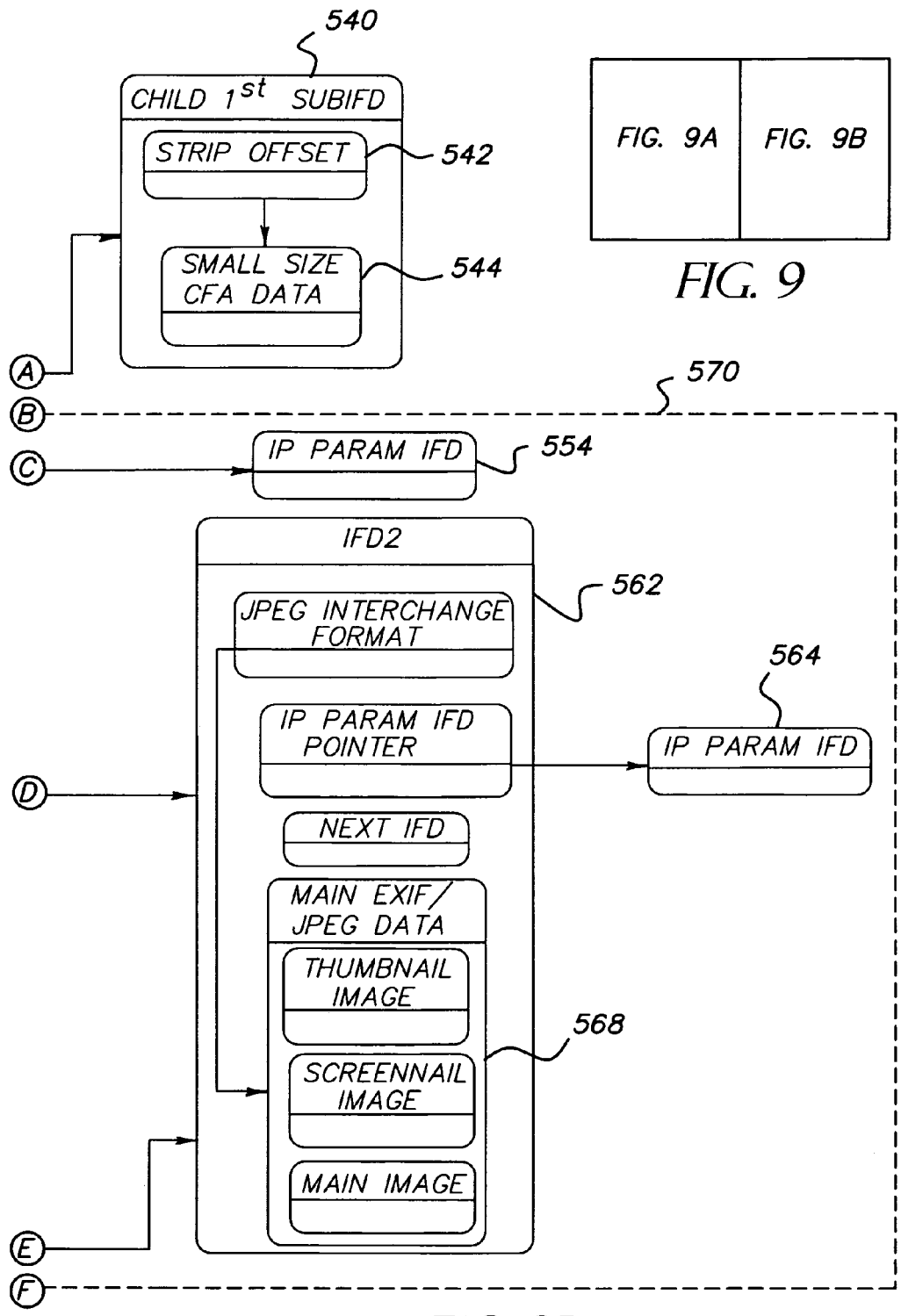

FIG. 8 is a block diagram depicting an example of the image processing operations that can be performed by the digital signal processor 46 in the digital camera 30A to produce an image file 450 providing raw and compressed image data. FIGS. 9A and 9B, in combination, show an example of the structure of the digital image file 450.

In block 402 of FIG. 8, the sensor CFA data 400 stored in the DRAM buffer memory 45 (see FIG. 7), is processed to correct sensor defects. This is done by identifying the defective pixels using a list stored in firmware memory 128 (which was programmed when the camera 30A was manufactured), and substituting, for the defective pixel value, a correction pixel value equal to the average value of the closest, non-defective pixels having the same color.

In block 404, the defect-corrected CFA sensor data is resampled to produce "small size" raw CFA data, having for example 640 columns×480 rows of Bayer pattern pixel data. The resizing can be done by averaging adjacent pixels of the same color.

In block 406, the defect-corrected full size CFA sensor data and the small size CFA sensor data are formatted for storage within the digital image file 450 shown in FIG. 9A, which in a preferred embodiment is a TIFF/EP file. This TIFF/EP file is compliant with ISO 12234-2:2001, Electronic still-picture imaging—Removable memory—Part2: TIFF/EP image data format, incorporated herein by reference.

Referring to FIG. 9A, the digital image file 450 includes a TIFF header 502, and an Image File Directory O (IFD0) 504 which includes a JPEG Interchange Format tag 506 which points to the portion of the digital image file 450 that is used to store the main Exif/IPEG data 510. This main Exif/IPEG data 510 includes a main JPEG compressed image 512, a JPEG compressed screennail image 514, and a JPEG compressed thumbnail image 516. The process used to produce these JPEG compressed images will be described later in reference to blocks 408-424.

The IFD0 504 also includes an Exif IFD pointer 520, which points to standard Exif metadata that is stored in ExifIFD 522. The IFD0 504 also includes an Image Processing Parameter IFD Pointer 524, which points to IP ParamIFD 526 that stores the image processing parameters which have been used to produce the main Exif/JPEG data 510.

The IFD0 504 also includes a SubIFDPointer 528 which includes a pointer to a Child $0^{th}$ SubIFD 530 which contains a StripOffset pointer 532 that points to the Main CFA Data 536. This Main CFA Data 536 is the sensor defect corrected CFA data from block 402 of FIG. 8.

The SubIFDPointer 528 also includes a pointer to a Child $1^{st}$ SubIFD 540 which contains a StripOffset pointer 542 that points to the Small Size CFA 544 data. This Small Size CFA 544 data is the CFA image resampled data from block 404 of FIG. 8. When the digital image file 450 is later processed by the computer 32, this small size raw CFA data 544 can be used to enable the computer 32A to more quickly produce a display-sized processed image on the display 58A, because it has many fewer pixels to process than if the computer 32A had to process the full size CFA image data.

Once the digital image file 450 has been modified on the computer 32 (as will be described later in reference to FIG. 10), the IFD0 504 can also include pointers to additional modified JPEG images 570, which are added to the digital image file 450 when it is saved as a modified image file. For example, the first time the image is modified, the NextIFD pointer 550 points to an IFD1 (Main Image Modified JPEG) 552, which contains the main Exif/JPEG data 558 (which is the modified image), as well as a pointer to the IPParamIFD 554 which contains the image processing settings used to produce the modified main Exif/JPEG data 558.

The next time the image file is modified and saved, an IFD2 (Main Image Modified JPEG) 562 is used to store the second modified main Exif/JPEG data 568, and an IPParamIFD 564 that contains the image processing settings used to produce this second modified main Exif/JPEG data 568 is added to the digital image file 450. In addition, a LastIFD Pointer 560 is added to IFD0 504, and a NextIFD 556 pointer is added to IFD1 552, both of which point directly to IFD2 562.

Each time the digital image file 450 is subsequently modified and saved, an additional IFD (e.g. IFD3, IFD4, etc.) can be added to the digital image file 450, and the LastIFD pointer 560 can be updated to point to the new IFD.

Returning to FIG. 8, in block 408, the image data is cropped, if the digital zoom function or the panoramic function has been enabled by the user, using the user controls 134. This cropping uses the digital zoom/pan settings 428.

In block 410, the rotated/cropped CFA data is noise cleaned. This noise cleaning uses noise cleaning settings 430 provided as part of the image processing parameters 444. This processing can use the noise cleaning method described in commonly-assigned U.S. Pat. No. 6,625,325, to Adams et. al., the disclosure of which is herein incorporated by reference.

In the color sensor demosaicing block 412, the noise filtered CFA data is color interpolated to provide full resolution RGB image data. The processing uses the rotate/resample settings 432. The CFA image data is rotated if necessary, if the gravitational orientation sensor 140 indicates that the digital camera 30A was held in a portrait orientation as the image was captured. Also, if the CFA image data was cropped in block 408 to provide digital zooming, the image is resampled in block 412 to produce a full size image file. This can be done using the methods described in commonly assigned U.S. Pat. No. 6,650,366, to Parulski, et al., the disclosure of which is herein incorporated by reference.

In block 414, the full resolution RGB data is white balanced, using a white balance setting 434. The white balance setting 434 can indicate a particular illuminant (e.g. daylight, tungsten) or an automatic white balance mode.

In block 416, the white balanced RGB data is tone scale and color processed. This processing uses tone and color settings 436, which may identify one of a plurality of color matrixes and tone modification curves. This processing can use the methods described in chapter 12.6 "tone scale/color processing" of the Digital Color Imaging Handbook, published in 2003 by CRC Press LLC, Boca Raton, Fla., which is incorporated herein by reference. In particular, the color processing can use, for example, a 3×3 linear space color correction matrix 20 depicted in FIG. 3 of commonly-assigned U.S. Pat. No. 5,189,511, to Parulski et al., the disclosure of which is incorporated herein by reference.

In block 418, the processed RGB image data is sharpened, using sharpening settings 438. The image sharpening processing can utilize the method described in commonly-assigned U.S. Pat. No. 4,962,419, to Hibbard et. al., the disclosure of which is incorporated herein by reference. For example, the sharpening setting can identify one of a plurality of coring lookup tables which provide different amounts of amplification of the "detail" signal used to sharpen the image.

In block 420, the sharpened image data is JPEG compressed, using the compression settings 440 which include a compression quality setting. The image compression can use the method described in commonly-assigned U.S. Pat. No. 4,774,574, to Daly et. al., the disclosure of which is incorporated herein by reference. The compression quality setting can identify one of a plurality of quantization tables, for example, three different tables, for the quantize block 26 in FIG. 1 of the '574 patent. These tables provide different quality levels and average file sizes for the JPEG compressed image file.

In block 424, the sharpened image data is resampled to produce a two smaller size images. This resampling can be accomplished as described in commonly-assigned U.S. Pat. No. 5,164,831, to Kuchta, et al., the disclosure of which is herein incorporated by reference. These include a thumbnail size image having for example 160 rows×120 columns, and a screennail size image having for example 640 rows×480 columns. In block 426, the thumbnail and screennail images are JPEG compressed.

In block 422, the JPEG compressed fill resolution "main" image, the JPEG compressed thumbnail image, and the JPEG compressed screennail image are formatted together in an Exif/JPEG image file, as defined in "Digital Still Camera Image File Format (Exif)" version 2.1, July 1998 by the Japan Electronics Industries Development Association (JEIDA), Tokyo, Japan. This format includes an Exif application segment that stores particular image metadata, including the date/time the image was captured, as well as the lens f/number and other camera settings. The result is the main Exif/JPEG data 510 in FIG. 9A.

The digital zoom/pan settings 428, noise cleaning settings 430, white balance setting 434, tone and color settings 436, sharpening settings 438, and compression settings 440 are all included in the image processing parameters 444. In block 448, these parameters are formatted as TIFF tags that are stored within the Image Processing parameters IFD 526 in FIG. 9A.

Figure 10:
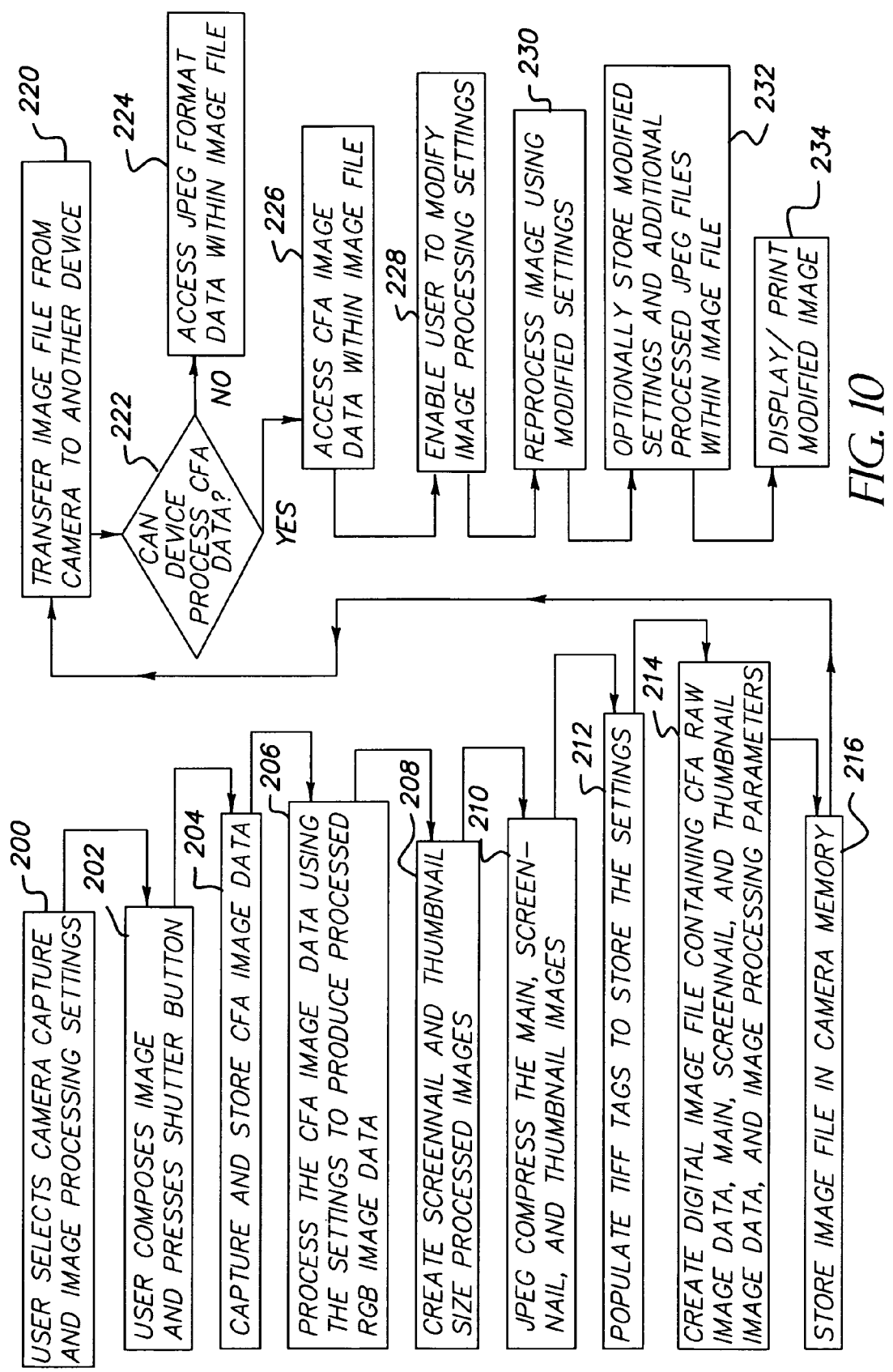
FIG. 10 is a flow diagram showing a method of implementing the present invention using the system of FIG. 7.

FIG. 10 is a flow diagram showing a method of implementing the present invention using the system of FIG. 7

In block 200 of FIG. 7, the user selects the camera capture and image processing parameters 444 (shown in FIG. 8) for the camera 30A. This is done using the user controls 134, as described earlier in reference to FIG. 7. Some or all of these settings can be default settings stored in the firmware memory 128 of the camera 30A.

In block 202, the user composes the image using the color display 132, or an optical viewfinder (not shown) on the digital camera 30A.

In block 204, the sensor CFA image data is captured and temporarily stored in the DRAM buffer memory 45.

In block 206, the CFA image sensor data is processed by the digital signal processor 46 to produce processed RGB image data, using the image processing parameters 444, as was described earlier in reference to blocks 408 to 418 of FIG. 8.

In block 208, the digital signal processor 46 creates screennail and thumbnail size processed images, as was described earlier in reference to block 424 of FIG. 8.

In block 210, the main, screennail, and thumbnail images are JPEG compressed as was described earlier in reference to blocks 420 and 424 of FIG. 8.

In block 212, the TIFF tags stored in the IPParamIFD 526 in FIG. 9A are populated with the image processing parameters 444, as was described earlier in reference to block 448 of FIG. 8.

In block 214, the digital image file 450 in FIG. 9, containing the main CFA image data 536, the small size CFA image data 544, the main image data 512, the screennail image data 514, the thumbnail image data 516, and the image processing parameters 444 (stored in IPParamIFD 526) is produced by the digital signal processor 46.

In block 216, the digital image file 450 is stored on the removable memory card 50A or other memory device.

In block 220, the digital image file 450 is transferred from the camera 30A to another device, such as the computer 32A, the retail photo printer 360, or the home photo printer 358, as was described earlier in reference to FIG. 7.

In block 222, the device that received the transferred digital image file 450 determines if it is capable of processing the CFA image data.

In block 224, if the device is not able to process CFA image data (no to block 222), the device accesses the JPEG/Exif format image data 510 from within the digital image file 450. This allows the device to use the image as if it were a standard JPEG/Exif image file. This JPEG/Exif image data can then be displayed, printed, recorded, or transmitted by the device.

In block 226, if the device is able to process CFA image data (yes to block 222), the device accesses the main CFA image data 536 from within the digital image file 450. The device may also access the small size CFA image data 544, in order to quickly produce a viewable image that can be interactively modified by the user.

In block 228, the user of the device can modify the image processing parameters 444, if desired. Thus, the user can modify the digital zoom/pan settings to provide more (or less) cropping. For example, if the panoramic setting provided a wide aspect ratio image by cropping out the top and bottom rows in block 408 of FIG. 8, some or all of these rows can be included in the modified image. As another example, the noise cleaning thresholds 430 and sharpening settings 438 can be modified to better balance the noise suppression and image sharpness. As another example, if an image was captured with tungsten selected as the illuminant, but the light source was actually daylight, the CFA image can be reprocessed, as though daylight was selected in the first place. The exposure and flare can also be adjusted by modifying the tone & color settings 436.

In some embodiments, the user can also be provided with other controls that were not included in the digital camera. For example, the controls could allow the user to independently adjust the scene lighting in the shadows, mid-tones, and highlights of the captured image. These adjustments can be previewed using the small size CFA data 544, to reduce the computation time needed to enable the user to interactively determine their preferred image processing settings.

In block 230, the main CFA image data 536 is reprocessed using the user modified settings. This is similar to repeating blocks 408 through 418 of FIG. 8, using different image processing parameters 444.

In block 232, the modified settings and additional processed JPEG files are stored within the digital image file 450. To provide these JPEG files, the reprocessed image data from block 230 is resampled to produce thumbnail and screennail images of the modified image, and the main, thumbnail, and screennail images are JPEG compressed and included in IFD1 (Main Image Modified JPEG) 552, which was described earlier in reference to FIG. 9A. In addition, the image processing parameters used to produce the modified image are stored in the IPParamIFD 564.

In an alternative embodiment, instead of adding IFD1 552 and IPParamIFD 554 to the digital image file 450 when the image is modified, the main Exif/JPEG data 510 can be replaced with the modified JPEG image data, and the IPParamIFD 526 parameters can be replaced with the modified parameters.

In block 234, the modified, processed CFA image data is displayed, for example using the display 58A, or printed, for example using the printer 60A.

The invention has been described with reference to several preferred embodiments. However, it will be appreciated that variations and modifications can be effected by a person of ordinary skill in the art without departing from the scope of the invention.

PARTS LIST 10 capture step
12 connect step
14 downloading step
16 processing step
18 file formatting step
19 header
20 viewing parameters
21 property set data
22 extension property set data
23 thumbnail image data
24 complete image data
25 lower resolution image data
26 discard step
27 editing step
28 application step
30 camera
30A camera
32 host computer
32A host computer
34 optical section
36 image sensor
38 lens
38A zoom lens
40 shutter-aperture device
42 clock generator and driver circuit
44 ASP and A/D section
45 DRAM buffer memory
46 digital signal processor
48 output interface
48a memory card interface
50 removable memory
50A removable memory
52 interface driver
54 control processor
56 card reader
56A memory card reader
58 display
58A display
60 hard copy printer
60A printer
70 transmission link
72 remote computer
74 remote output device
80 file format extension step
82 editing step
84 printing step
86 local linkage
88 remote linkage
90 separation step
92 CFA pattern and compression method data
94 CFA image data
95 camera MTF calibration data
96 camera ICC profile
98 thumbnail image data
100 advanced edits list
102 application segment
122 DRAM buffer memory
128 firmware memory
130 flash
132 color display
134 user controls
140 gravitational orientation sensor
162 dock interface
200 block
202 block
204 block
206 block
208 block
210 block
212 block
214 block
216 block
220 block
222 block
224 block
226 block 228 block
230 block
232 block
234 block
358 home photo printer
360 retail photo printer
364 dock/recharger
400 sensor CFA data
402 sensor defect correction
404 CFA image resampling
406 TIFF raw file formatting
408 CFA data cropping
410 sensor noise cleaning
412 color sensor demosaicing
414 white balance
416 tonescale/color processing
418 sharpening
420 JPEG compression
422 Exif file formatting
424 thumbnail & screennail resampling
426 JPEG compression
428 digital zoom/pan settings
430 noise cleaning thresholds
432 rotate/resample settings
434 white balance settings
436 tone & color settings
438 sharpening settings
440 compression settings
444 image processing parameters
448 TIFF tag formatting
450 digital image file
502 TIFF header
504 IFD0
506 JPEGInterchangeFormat Pointer
510 main Exif/JPEG data
512 main image
514 screennail image
516 thumbnail image
520 ExifIFDPointer
522 ExifIFD
524 IPParamIFDPointer
526 IPParamIFD
528 SubIFDPointer
530 Child $0^{th}$ SubIFD
532 strip offset
536 main CFA data
540 Child $1^{st}$ SubIFD
542 strip offset
544 small size CFA data
550 NextIFD
552 IFD1
554 IPParamIFD
556 NextIFD
558 Main Exif/JPEG data
560 Last IFD pointer
562 IFD2
564 IPParamIFD
568 Main Exif/JPEG data
570 additional modified JPEG images

What is claimed is:

1. An electronic image capture device for capturing a color image, comprising:
   an image sensor comprised of discrete light sensitive picture elements overlaid with a color filter array (CFA) pattern to produce sensor color image data corresponding to the CFA pattern;
   an A/D converter for producing uninterpolated digital CFA image data from the sensor color image data;
   a processor for processing the uninterpolated digital CFA image data to produce interpolated image data and for forming a TIFF image file containing both the uninterpolated CFA image data and the interpolated image data; and
   a memory for storing the TIFF image file.

2. The image capture device as claimed in claim 1 wherein the interpolated image data is stored in a JPEG compressed bitstream within the TIFF image file.

3. The image capture device as claimed in claim 1 wherein the processor uses at least one parameter to perform the image processing operations used to produce the interpolated image data, and the TIFF image file further stores the at least one parameter.

4. The image capture device as claimed in claim 3 wherein the processor sharpens the interpolated image data, and the TIFF image file stores a parameter specifying the amount of sharpening.

5. The image capture device as claimed in claim 3 wherein the processor adjusts the white balance of the interpolated image data, and the TIFF image file stores a parameter specifying the white balance adjustment.

6. The image capture device as claimed in claim 1 wherein the TIFF image file also stores data that defines the type of color filter array pattern used on the image sensor.

7. The image capture device as claimed in claim 1 wherein the processor also produces a reduced size, uninterpolated CFA image data, and the TIFF file also contains the reduced size uninterpolated CFA image data.

* * * * *